A. P. BARNES.
Spirometer.
No. 51,002. Patented Nov. 21, 1865.
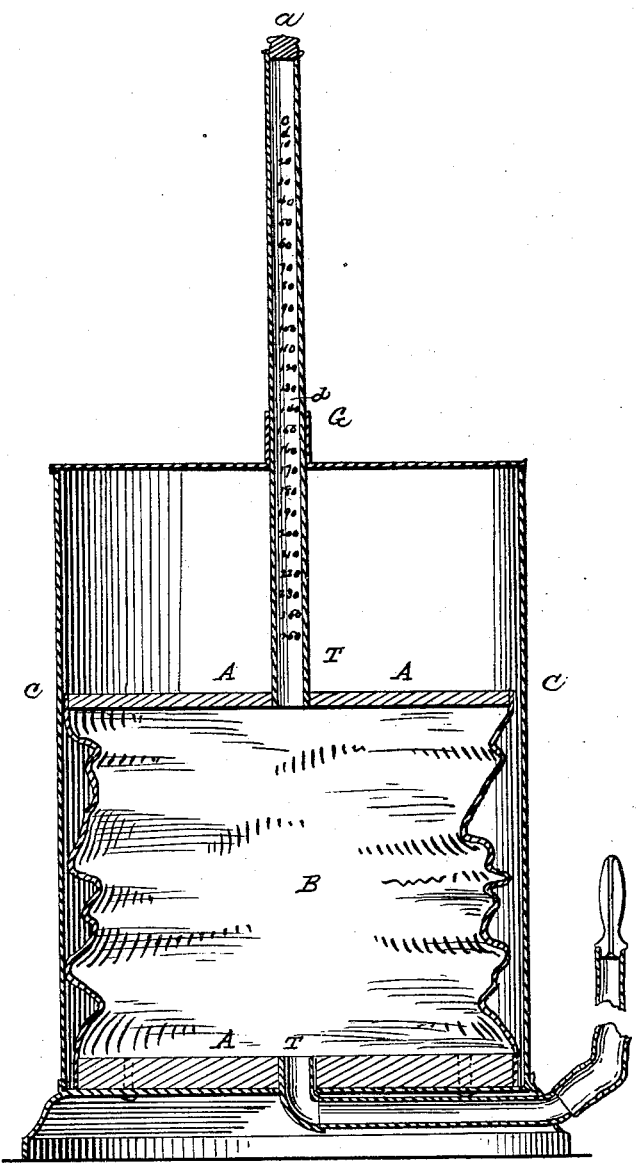
WITNESSES:
INVENTOR.

UNITED STATES PATENT OFFICE.

AARON P. BARNES, OF BOSTON, MASSACHUSETTS.

IMPROVEMENT IN SPIROMETERS.

Specification forming part of Letters Patent No. 51,002, dated November 21, 1865.

*To all whom it may concern:*

Be it known that I, AARON P. BARNES, of Boston, in the county of Suffolk and State of Massachusetts, have invented a new and useful Improvement in Spirometers; and I do hereby declare that the following is a full, clear, and exact description of the construction and operation of the same, reference being had to the accompanying drawing, forming a part of this specification, being a vertical section of the machine.

The nature of my invention consists in the application of a flexible or elastic bag or bellows placed in a suitable incasement of tin or other material, which bag or bellows, on being inflated, will measure the amount of air forced in by the lungs.

Prior to my invention spirometers had been made by the employment of two vessels open at one end, and one fitting in the other, the joint between the two made air-tight by means of water or other liquid. The air being forced in would cause the upper vessel to rise, and thereby indicate the measure of air. It will be seen at once that spirometers constructed in this way are expensive, comparatively, and very inconvenient, while my spirometers are made with but little expense and are very portable.

To enable others skilled in the art to make and use my said invention, I will now proceed to describe the construction and operation of the same.

C C is a metallic cylinder closed at top and bottom by disks perforated at their centers for admission of tubes T T'. In this cylinder is an india-rubber or other flexible cylinder of known capacity, B, closed at top and bottom by wooden disks A A A A, the bottom disk being securely fastened to the bottom of the cylinder C, or being substituted by such cylinder, while the top disk is free to rise and fall in the cylinder C, governed only by the amount of air in the flexible cylinder or bellows B, the tube T' and collar G maintaining the said cylinder B perpendicular and allowing top disk A to move without friction in cylinder C. The top disk A is perforated by a metallic tube, T', opening into the cavity of the bellows B, and closed at the top by a removable stopper, *a*, and the bottom disk A A, is perforated by tube T opening into the interior of the bellows B, through which the air is blown. On the side of tube T' is a scale, *d d d*, marked with figures, the position of which against the edge of the collar G denote the number of cubic inches of air in the flexible cylinder or bellows B.

On blowing into tube T the bellows B expands, top disk A rises, carrying with it tube T', which slides through the collar G, and by simple inspection of the figure on the scale *d d d* next to collar G the number of cubic inches of air expired into the bellows B can be known. On removing stopper *a* the weight of top diks A and tube T' expresses the air from bellows B, and top disk A falls, carrying with it tube T', when the machine is again ready for a new test of the capacity of lungs.

What I claim, and desire to secure by Letters Patent, is—

1. The application of a flexible or elastic bag or bellows for spirometers, as described.

2. The apparatus as constructed as an article of manufacture.

AARON P. BARNES.

Witnesses:
R. LAPHAM,
B. W. BALL.